(12) United States Patent
Chung et al.

(10) Patent No.: US 12,546,715 B2
(45) Date of Patent: Feb. 10, 2026

(54) ELECTRONIC DEVICE AND METHOD FOR DETECTING FILTER STATUS

(71) Applicant: ASUSTeK COMPUTER INC., Taipei (TW)

(72) Inventors: Jun-Shang Chung, Taipei (TW); Chih-Fong Shih, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 260 days.

(21) Appl. No.: 18/451,061

(22) Filed: Aug. 16, 2023

(65) Prior Publication Data

US 2024/0393240 A1 Nov. 28, 2024

(30) Foreign Application Priority Data

May 25, 2023 (TW) ................ 112119545

(51) Int. Cl.
  *G01N 21/55* (2014.01)
  *B01D 27/10* (2006.01)
  *G08B 21/24* (2006.01)

(52) U.S. Cl.
  CPC ........... *G01N 21/55* (2013.01); *B01D 27/101* (2013.01); *G08B 21/24* (2013.01)

(58) Field of Classification Search
  CPC ............. G01N 21/95692; G01N 21/94; G01N 2015/045; G08B 21/24; B01D 27/101
  See application file for complete search history.

(56) References Cited

U.S. PATENT DOCUMENTS 11,607,635 B2 * 3/2023 Arthur ................ B01D 46/429

FOREIGN PATENT DOCUMENTS

| CN | 101498959 | | 8/2009 | |
| CN | 102063364 | | 5/2011 | |
| CN | 110608509 | | 12/2019 | |
| CN | 112179823 | | 1/2021 | |
| CN | 112179823 | A * | 1/2021 | ............. G08B 21/24 |
| JP | 2013022539 | A * | 2/2013 | |

OTHER PUBLICATIONS

Bill Schweber. "How to Use Photodiodes and Phototransistors Most Effectively". DigiKey. Sep. 11, 2018. (Year: 2018).*
Machine Translation of He (CN-112179823-A) (Year: 2021).*
Machine Translation of Iwaki (JP-2013022539-A) (Year: 2013).*

* cited by examiner

*Primary Examiner* — Uzma Alam
*Assistant Examiner* — Paul Schnase
(74) *Attorney, Agent, or Firm* — JCIPRNET

(57) ABSTRACT

A method for detecting filter status is applicable to an electronic device including a filter, and the method includes the following steps. In response to activation of the electronic device, timing is started and an accumulated operating time is obtained. In response to the accumulated operating time being greater than or equal to a time threshold value, a level of dirtiness of the filter is detected through an optical sensing element. The time threshold value is adjusted according to the level of dirtiness of the filter. A notification related to the filter is provided according to the level of dirtiness of the filter.

18 Claims, 7 Drawing Sheets

ELECTRONIC DEVICE AND METHOD FOR DETECTING FILTER STATUS

CROSS-REFERENCE TO RELATED APPLICATION

This application claims the priority benefit of Taiwan application serial no. 112119545, filed on May 25, 2023. The entirety of the above-mentioned patent application is hereby incorporated by reference herein and made a part of this specification.

BACKGROUND

Technical Field

The disclosure relates to an electronic device, and in particular, relates to an electronic device and a method for detecting filter status.

Description of Related Art

Generally, many elements inside an electronic device generate heat energy during operation. Therefore, the electronic device is generally provided with a vent and a fan to discharge heat energy inside the electronic device. In order to prevent dust in the air from entering the interior of the electronic device through the vent, the vent of the electronic device is generally provided with a filter. The filter may prevent dust in the air from being brought into the interior of the electronic device. But it is conceivable that as the working hours of electronic device increase, dust will gradually accumulate on the filter. Blockage of the filter may result in a reduction in air intake, and the heat dissipation efficiency is thus lowered.

Therefore, in order to keep the airflow of the vent smooth, the filter with severe dust accumulation must be replaced or cleaned, so as to avoid the reduction of heat dissipation efficiency and the adverse effect on the performance of the electronic device. Generally speaking, the timing of cleaning or replacing the filter depends on the rule of thumb, and the electronic device will remind the user to clean or replace the filter according to a fixed time limit.

However, the mechanism design and heat dissipation design of electronic devices are various, and the working status and environment of the electronic device are also different. Therefore, replacing the filter according to a fixed time limit is not a way to truly replace the filter according to dust accumulation. If the filter has serious dust accumulation and cannot be replaced in time, it will lead to poor operation performance of the electronic device, and even cause failure of elements in the electronic device.

SUMMARY

The disclosure provides an electronic device and a method for detecting filter status capable of allowing a user to clean a filter of the electronic device at a proper time and the heat dissipation function of the electronic device to function normally.

The disclosure provides a method for detecting filter status applicable to an electronic device including a filter, and the method includes the following steps. In response to activation of the electronic device, timing is started and an accumulated operating time is obtained. In response to the accumulated operating time being greater than or equal to a time threshold value, a level of dirtiness of the filter is detected through an optical sensing element. The time threshold value is adjusted according to the level of dirtiness of the filter. A notification related to the filter is provided according to the level of dirtiness of the filter.

The disclosure further provides an electronic device including a filter, an optical sensing element, a human-machine interface device, and a processor. The processor is coupled to the optical sensing element and the human-machine interface device and is configured to perform the following steps. In response to activation of the electronic device, timing is started and an accumulated operating time is obtained. In response to the accumulated operating time being greater than or equal to a time threshold value, a level of dirtiness of the filter is detected through an optical sensing element. The time threshold value is adjusted according to the level of dirtiness of the filter. A notification related to the filter is provided according to the level of dirtiness of the filter.

To sum up, in the embodiments of the disclosure, during the booting period of the electronic device, the accumulated operating time of the electronic device is continuously counted. When the accumulated operating time increases to be greater than or equal to the time threshold value, the level of dirtiness of the filter may be detected through the optical sensing element, so that a notification related to filter is provided according to the level of dirtiness of the filter. It should be noted that the above time threshold value is adaptively adjusted according to the level of dirtiness detected by the optical sensing element. Based on the above, a user can know the proper time to clean or replace the filter, and poor performance or failure of the electronic device caused by late replacement of the filter is thereby avoided.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
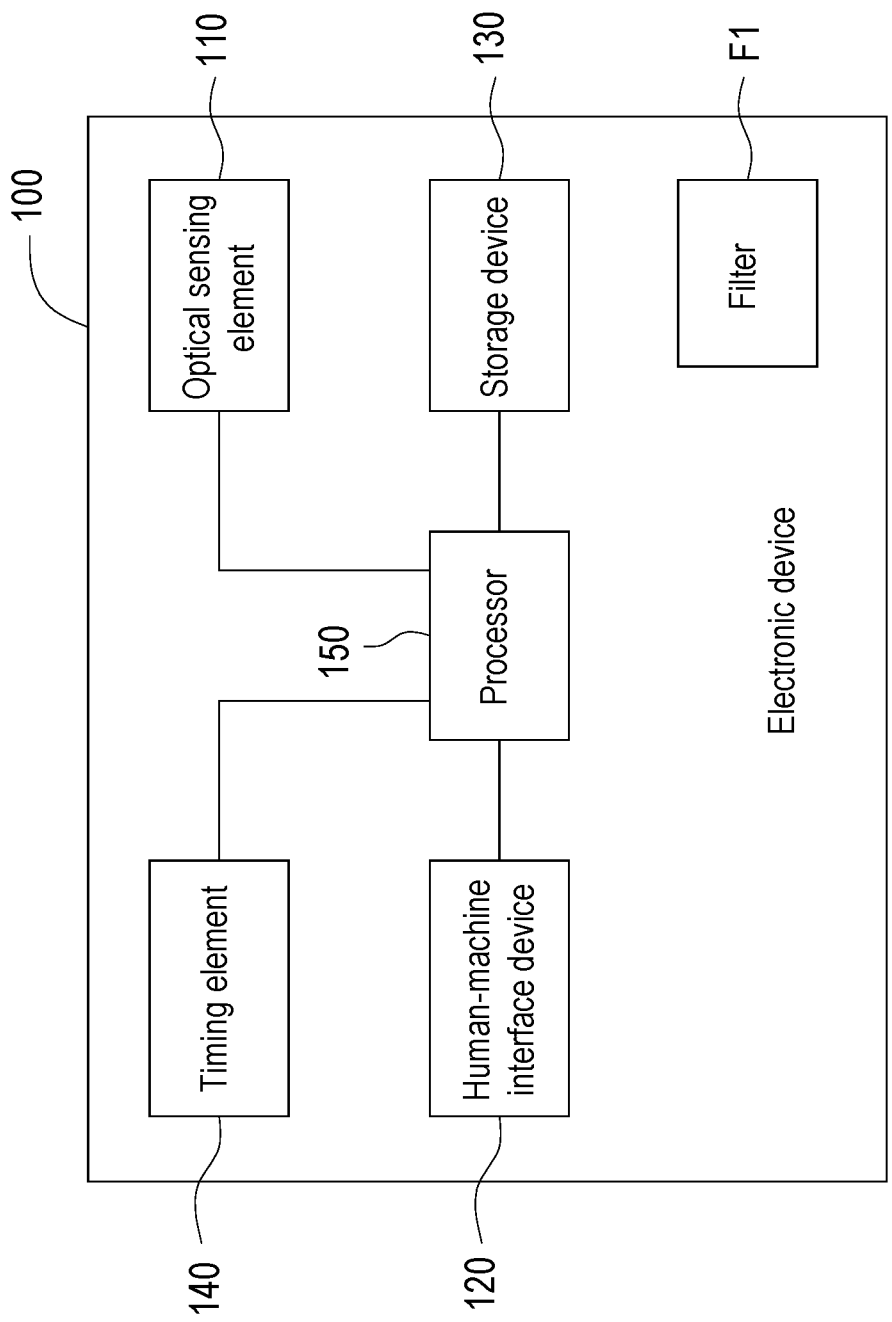
FIG. 1 illustrates a schematic block diagram of an electronic device according to an embodiment of the disclosure.

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, the embodiments serve as examples of the apparatus and method fall within the scope of the claims of the disclosure.

With reference to FIG. 1, which illustrates a schematic diagram of an electronic device according to an embodiment of the disclosure. An electronic device 100 may be, for example, a desktop computer, a notebook computer, a server device, a projector, or other electronic equipment provided with one or more filters, and the disclosure is not limited thereto. The electronic device 100 may include a filter F1, an optical sensing element 110, a human-machine interface device 120, a storage device 130, a timing element 140, and a processor 150.

The filter F1 may be disposed on a casing or a frame of the electronic device 100 to prevent external dust from entering the electronic device 100. In some embodiments, the filter F1 may be disposed at a vent. In some embodiments, the electronic device 100 may further include a fan (not shown). When the electronic device 100 is operating, the vent and the fan are used to discharge heat energy inside the electronic device 100. The dust accumulation on the filter F1 may affect the air flow, so the dust accumulation on the filter F1 may affect the heat dissipation efficiency of the electronic device 100.

The optical sensing element 110 may be configured to detect a level of dirtiness of the filter F1. The level of dirtiness of the filter F1 is the amount of dust accumulated on the filter F1. The optical sensing element 110 may detect the level of dirtiness of the filter F1 according to the intensity of the sensed light. For instance, the optical sensing element 110 may be a reflective infrared sensing device.

Figure 2:
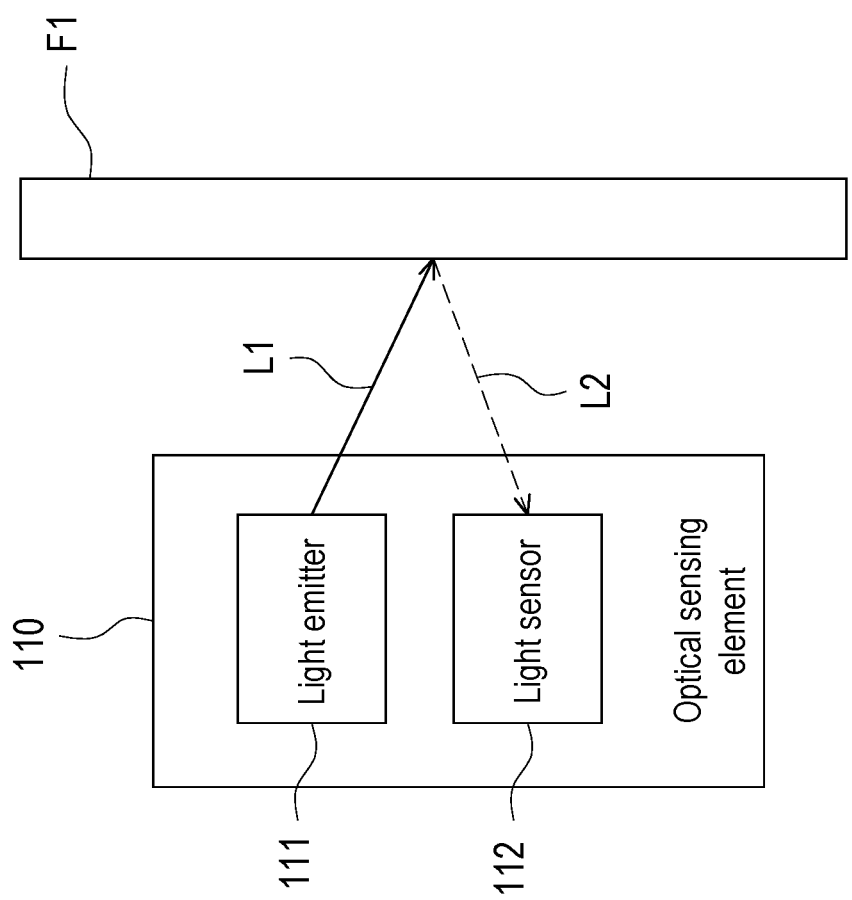
FIG. 2 illustrates a schematic diagram of an optical sensing element detecting a level of dirtiness of a filter according to an embodiment of the disclosure.

With reference to FIG. 2, which illustrates a schematic diagram of an optical sensing element detecting a level of dirtiness of a filter according to an embodiment of the disclosure. In some embodiments, the optical sensing element 110 may include a light emitter 111 and a light sensor 112. The light emitter 111 emits a light ray L1 towards the filter F1, and the light sensor 112 may sense reflected light L2 of the light ray L1. The intensity of the reflected light L2 varies depending on the dust accumulation on the filter F1. To be specific, the filter F1 with pores is permeable to light, but the dust accumulated on the filter F1 may block these pores and cause the light transmittance of the filter F1 to drop. Therefore, the intensity of the reflected light L2 may increase as the amount of dust accumulated on the filter F1 increases. It thus can be seen that the intensity of the reflected light L2 sensed by the light sensor 112 may be used to detect the level of dirtiness of the filter F1.

The human-machine interface device 120 may include one or more input devices, such as a touch device, a keyboard, a mouse, or a button and the like. The human-machine interface device 120 may also include one or more output devices, such as a display, a speaker, or a warning light and the like. The user of the electronic device 100 may interact with the electronic device 100 through the human-machine interface device 120. In some embodiments, the processor 150 may provide a notification to the user to clean the filter F1 through the output device of the human-machine interface device 120.

The storage device 130 may be configured to store data and a software module and the like and may be, for example, a fixed or movable random access memory (RAM) in any form, a read-only memory (ROM), a flash memory or other similar devices, an integrated circuit, and a combination thereof.

The timing element 140 may provide a timing function. The timing element 140 is, for example, a timing circuit. The timing element 140 may be a timer operated according to a system clock of the electronic device 100.

The processor 150 is coupled to the optical sensing element 100, the human-machine interface device 120, the storage device 130, and the timing element 140 and is, for example, a processor for general use, a processor for special use, a conventional processor, a digital signal processor, a microprocessor, one or a plurality of microprocessors combined with a digital signal processor core, a controller, a microcontroller, an application specific integrated circuit (ASIC), a field programmable gate array (FPGA) circuit, an integrated circuit of any other types, a state machine, or other similar devices.

The processor 150 may access and execute software modules recorded in the storage device 130, so as to implement a method for detecting filter status provided in the embodiments of the disclosure. The software modules may be construed broadly to mean instructions, instruction sets, codes, program codes, programs software packages, threads, procedures, functions, etc., whether referred to as software, firmware, intermediate software, microcode, hardware description language, or otherwise.

Figure 3:
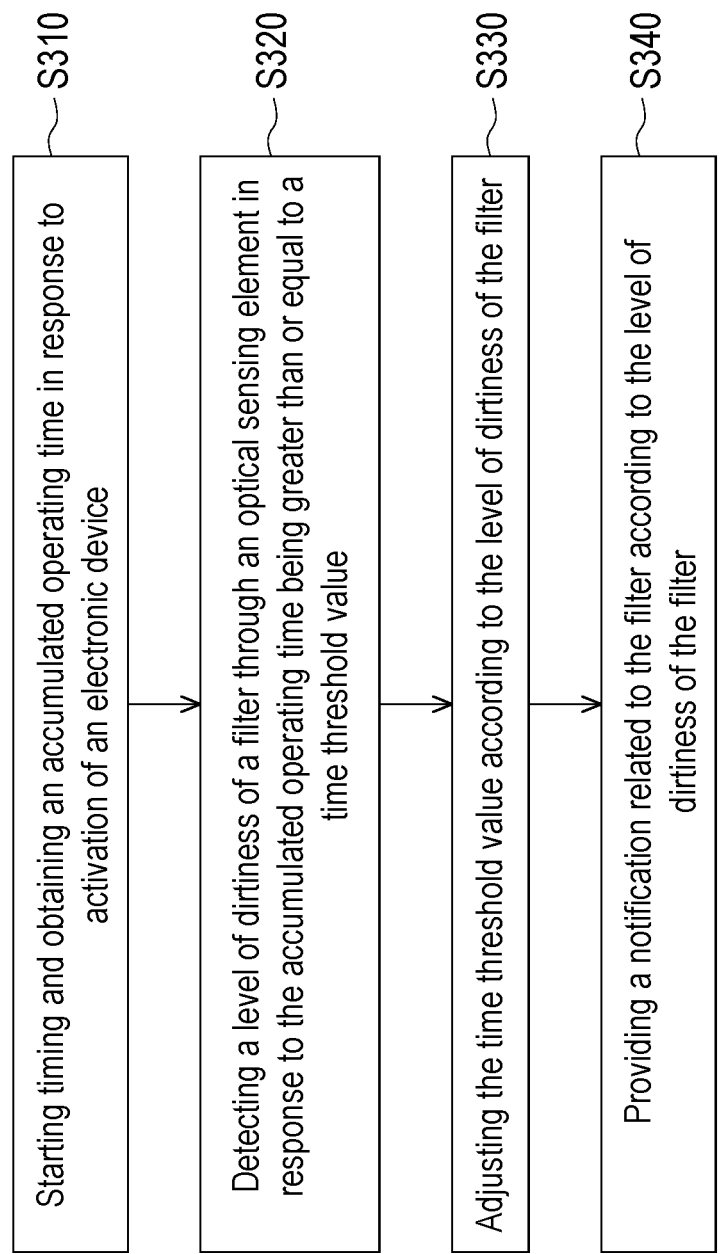
FIG. 3 illustrates a flow chart of a method for detecting filter status according to an embodiment of the disclosure.

FIG. 3 illustrates a flow chart of a method for detecting filter status according to an embodiment of the disclosure. With reference to FIG. 1 and FIG. 3, the method provided by this embodiment is applicable to the electronic device 100 provided by the foregoing embodiments, and steps of the method for detecting the filter status provided by this embodiment are described in detail as follows together with the elements in the electronic device 100.

In step S310, in response to activation of the electronic device 100, the processor 150 starts timing and obtains an accumulated operating time. During the operation of the electronic device 100, the timing element 140 is triggered to count time, and the processor 150 may acquire the accumulated operating time of the electronic device 100 through the timing element 140. In some embodiments, the processor 150 may record the accumulated operating time provided by the timing element 140 into the storage device 130 every period of time. For instance, the processor 150 may record the accumulated operating time provided by the timing element 140 into the storage device 130 every 10 minutes, 30 minutes, or one hour, but not limited thereto.

In step S320, in response to the accumulated operating time being greater than or equal to a time threshold value, the processor 150 detects the level of dirtiness of the filter F1 through the optical sensing element 110. To be specific, the time threshold value is an estimated time when the filter F1 is expected to be cleaned. That is, when the accumulated operating time of the electronic device 100 reaches the time threshold value, the processor 150 may predict that the filter F1 may need to be cleaned. Therefore, when the processor 150 determines that the accumulated operating time is greater than or equal to the time threshold value, the processor 150 turns on the optical sensing element 110 to detect the level of dirtiness of the filter F1. As shown in the example of FIG. 2, the processor 150 may identify the level of dirtiness of the filter F1 according to a sensing result of the light sensor 112.

In step S330, the processor 150 adjusts the time threshold value according to the level of dirtiness of the filter F1. To be specific, when the electronic device 100 is operated in different environments or is operated based on different usage methods, the speed of dust accumulation on the filter F1 may be different. Based on this characteristic, when the accumulated operating time is greater than or equal to the time threshold value, the processor 150 may decide to maintain or modify the time threshold value according to the level of dirtiness of the filter F1 detected at the moment. To be more specific, one possible situation is that the accumulated operating time is greater than or equal to the time threshold value but the level of dirtiness of the filter F1 is such that cleaning is not yet required, so the processor 150 may extend the time threshold value. In this way, the time threshold value may be closer to the time when the filter F1 really needs to be cleaned.

In step S340, the processor 150 provides a notification related to the filter F1 according to the level of dirtiness of the filter F1. To be specific, when the processor 150 determines that the level of dirtiness of the filter F1 is such that cleaning is required, the processor 150 may provide a notification related to the filter F1 through the human-machine interface device 120 to notify the user to clean the filter F1. Alternatively, when the processor 150 determines that the level of dirtiness of the filter F1 is such that cleaning is not required, the processor 150 may provide another notification related to the filter F1 through the human-machine interface device 120 again to notify the user that the filter F1 does not need to be cleaned yet. In this way, the user may be notified to replace the filter F1 at a proper time.

In some embodiments, the processor 150 may control the light emitting color, the flashing frequency, or whether the light is on or not of an indicator light device in the human-machine interface device 120, so as to notify the user to clean the filter F1. Alternatively, in some embodiments, the processor 150 may control the display in the human-machine interface device 120 to display a notification message, so as to notify the user to clean the filter F1. Alternatively, in some embodiments, the processor 150 may control the speaker in the human-machine interface device 120 to emit a notification sound to, so as to notify the user to clean the filter F1.

Figure 4:
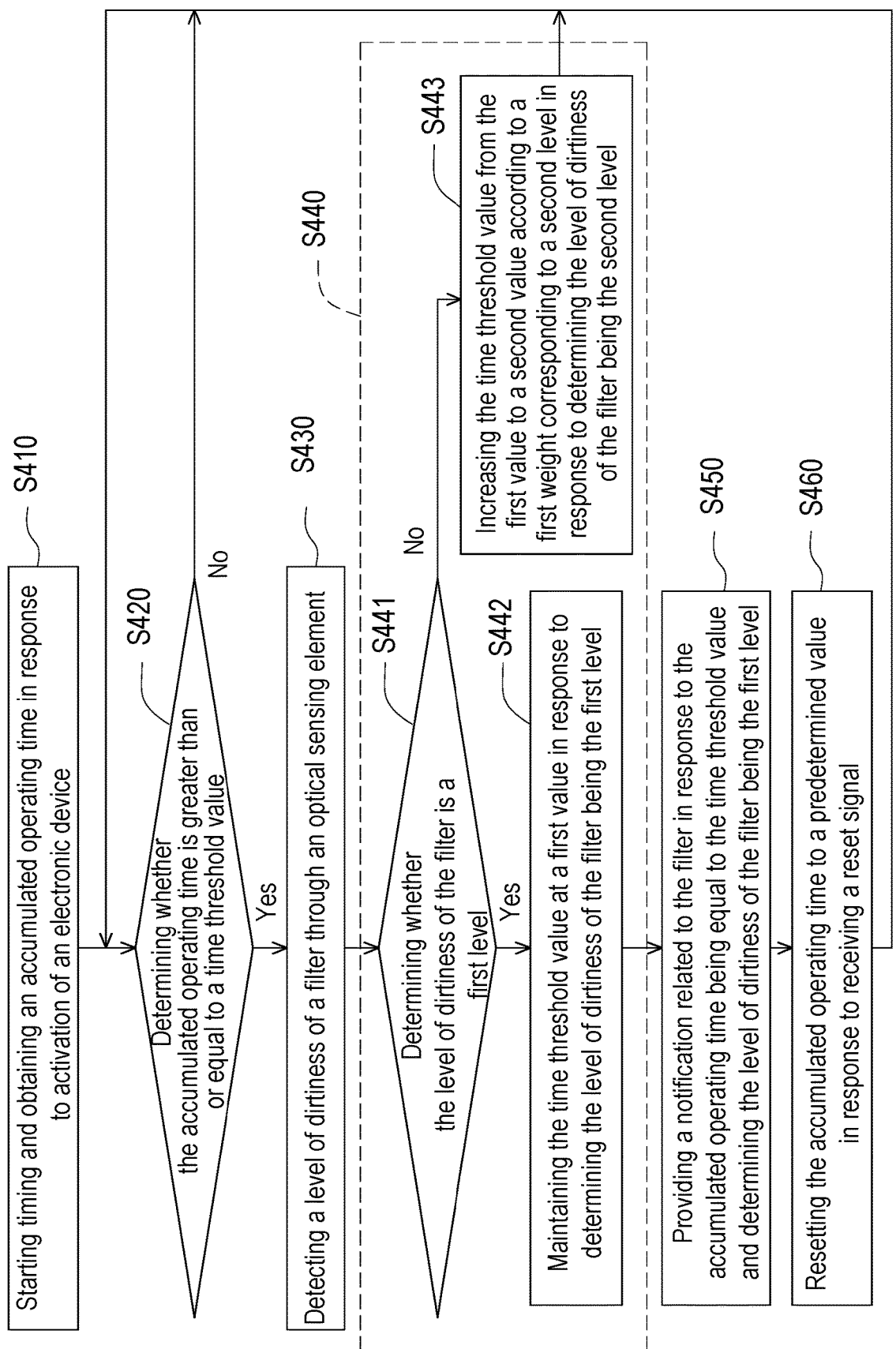
FIG. 4 illustrates a flow chart of a method for detecting filter status according to an embodiment of the disclosure.

FIG. 4 illustrates a flow chart of a method for detecting filter status according to an embodiment of the disclosure. With reference to FIG. 1 and FIG. 4, the method provided by this embodiment is applicable to the electronic device 100 provided by the foregoing embodiments, and steps of the method for detecting the filter status provided by this embodiment are described in detail as follows together with the elements in the electronic device 100.

In step S410, in response to the activation of the electronic device 100, the processor 150 starts timing and obtains an accumulated operating time. In step S420, the processor 150 determines whether the accumulated operating time is greater than or equal to a time threshold value. It should be noted that the time threshold value may be initially set to a predetermined initial value, such as 500 hours.

If yes is determined in step S420, in step S430, in response to the accumulated operating time being greater than or equal to the time threshold value, the processor 150 detects the level of dirtiness of the filter F1 through the optical sensing element 110. In addition, in step S440, in response to the accumulated operating time being greater than or equal to the time threshold value, the processor 150 adjusts the time threshold value according to the level of dirtiness of the filter F1. In some embodiments, step S440 may be implemented as steps S441 to S443.

In step S441, the processor 150 determines whether the level of dirtiness of the filter F1 is a first level. To be specific, the processor 150 may classify the level of dirtiness of the filter F1 into different levels according to the sensing result reported by the optical sensing element 110. Herein, the first level represents a severe level of dirtiness for which the filter F1 needs to be cleaned.

Therefore, if yes is determined in step S441, in step S442, in response to determining the level of dirtiness of the filter F1 being the first level, the processor 150 maintains the time threshold value at a first value. To be specific, when it is determined that the level of dirtiness of the filter F1 is the first level, it means that the filter F1 really needs to be cleaned, that is, the current time threshold value does represent the time that the filter F1 really needs to be cleaned. In this case, the processor 150 maintains the time threshold value at the first value, that is, does not change the time threshold value.

After that, in step S450, in response to the accumulated operating time being equal to the time threshold value and determining the level of dirtiness of the filter being the first level, the processor 150 provides a notification related to the filter F1. In step S460, in response to receiving a reset signal through the human-machine interface device 120, the processor 150 resets the accumulated operating time to a predetermined value. The predetermined value is 0, for example. To be specific, when the processor 150 determines that the level of dirtiness of the filter F1 is the first level such that cleaning is required, the processor 150 may provide a notification related to the filter F1 through the human-machine interface device 120 to notify the user to clean the filter F1. The user may use the human-machine interface device 120 to issue a reset signal after cleaning the filter F1. Correspondingly, the processor 150 may reset the accumulated operating time to 0 in response to the reset signal, so as to recount the accumulated operating time from 0.

In contrast, if no is determined in step S441, in step S443, in response to determining the level of dirtiness of the filter F1 being a second level, the processor 150 increases the time threshold value from the first value to a second value according to a first weight corresponding to the second level. Herein, the second level represents a mild level of dirtiness for which the filter F1 does not yet need to be cleaned. Therefore, when it is determined that the level of dirtiness of the filter F1 is the second level, it means that the filter F1 does not need to be cleaned yet, that is, there is a gap between the current time threshold value and the time when the filter F1 really needs to be cleaned. In this case, the processor 150 modifies the time threshold value. It should be noted that after the processor 150 extends the time threshold value in step S443, the processor 150 may keep on accumulating the accumulated operating time instead of resetting the accumulated operating time to the predetermined value (e.g., 0). Therefore, the processor 150 may then determine whether the continuously-accumulated accumulated operating time is equal to or greater than the extended time threshold value.

In some embodiments, the processor 150 may increase the time threshold value from the first value to the second value according to the first weight corresponding to the second level. The processor 150 may determine a time increase factor according to the first weight, multiplies the first value by the time increase factor, and obtains the second value. The first weight may be between 0 and 1. For instance, the processor 150 may increase the time threshold value from the first value to the second value according to the following formula (1).

$$Tth2=Tth1*(2-W)$$ formula (1), where Tth2 is the second value, Tth1 is the first value, W represents the first weight corresponding to the second level, and (2−W) is the time increase factor.

It is assumed that the first weight corresponding to the second level is 0.1 and the first value of the time threshold value is originally 500 hours. If the processor 150 determines that the level of dirtiness of the filter F1 is the second level when the accumulated operating time is equal to 500 hours, the processor 150 may increase the time threshold value from 500 hours to 950 hours. After that, the processor 150 continues to accumulate the accumulated operating time from 500 hours and may determine whether the accumulated operating time exceeding 500 hours is greater than or equal to 950 hours.

In some embodiments, the processor 150 may emit a light ray through the light emitter of the optical sensing element 110. The processor 150 may sense reflected light of the light ray and generate a sensing voltage through the light sensor of the optical sensing element 110. Therefore, the processor 150 may determine the level of dirtiness of the filter according to the sensing voltage. In some embodiments, the sensing voltage generated by the light sensor may be determined by a photo transistor operating in a linear region according to the reflected light.

Figure 5:
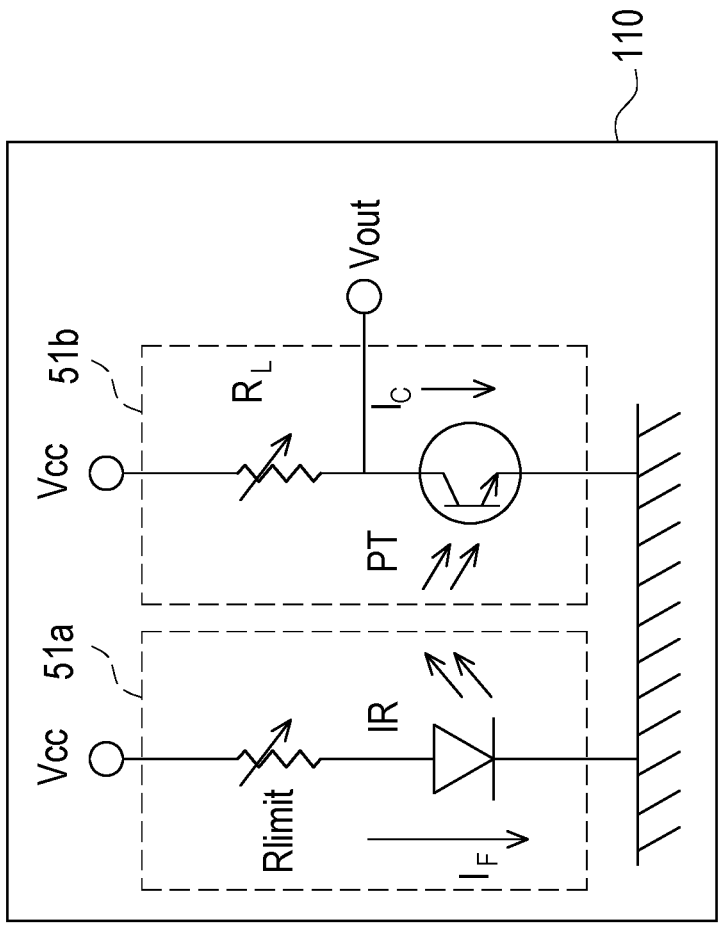
FIG. 5 illustrates a schematic diagram of the optical sensing element according to an embodiment of the disclosure.
Figure 6:
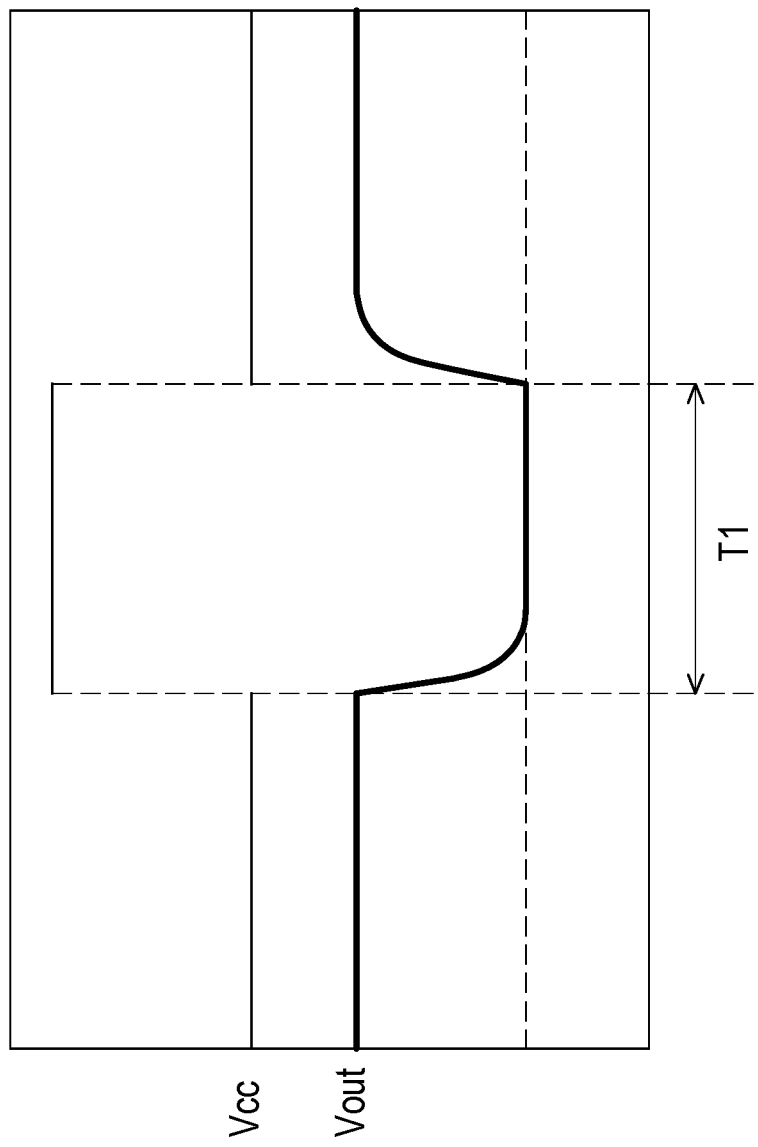
FIG. 6 illustrates a sequence diagram of a sensing voltage according to an embodiment of the disclosure.

For instance, FIG. 5 illustrates a schematic diagram of the optical sensing element according to an embodiment of the disclosure. FIG. 6 illustrates a sequence diagram of a sensing voltage according to an embodiment of the disclosure. With reference to FIG. 5 and FIG. 6 together, a light emitter 51a of the optical sensing element 110 may include a variable resistor Rlimit and an infrared (IR) light-emitting diode IR. A light sensor 51b of the optical sensing element 110 may include a variable resistor $R_L$ and a photo transistor PT. A control voltage Vcc is provided to both the light emitter 51a and the light sensor 51b.

One end of the variable resistor Rlimit is coupled to the control voltage Vcc, and the other end of the variable resistor Rlimit is coupled to one end of the IR light-emitting diode IR. One end of the variable resistor $R_L$ is coupled to the control voltage Vcc, and the other end of the variable resistor $R_L$ is coupled to one end of the photo transistor PT. The other end of the IR light-emitting diode IR and the other end of the photo transistor PT are coupled to a ground voltage.

When the high potential control voltage Vcc is provided to the light emitter 51a during a time interval T1, the IR light-emitting diode IR can emit IR light. The variable resistor Rlimit may be used to control the magnitude of a forward current $I_F$. As a current value of the forward current $I_F$ increases, the intensity of light emitted by the IR light-emitting diode IR increases. Correspondingly, the photo transistor PT of the light sensor 51b may receive reflected IR light reflected by the filter F1 during the time interval T1. When the photo transistor PT receives the reflected IR light reflected by the filter F1, the photo transistor PT generates a photocurrent Ic. It should be noted that when the photo transistor PT operates in the linear region, as the intensity of the reflected IR light received by the photo transistor PT increases, the current value of the photocurrent Ic increases. Therefore, the processor 150 may detect the level of dirtiness of the filter F1 according to a sensing voltage Vout outputted from one end of the photo transistor PT operating in the linear region.

To be more specific, when the reflected IR light is not present, the photo transistor PT is turned off, and the sensing voltage Vout is at a high potential. When irradiance of the reflected IR light is high, the photo transistor PT operates in a saturation region, and the sensing voltage Vout is at a high potential. When the irradiance of the reflected IR light is low, the photo transistor PT operates in the linear region, and the sensing voltage Vout is at a middle potential. To be more specific, the sensing voltage Vout generated by the photo transistor PT operating in the linear region may be Vcc−(Ic*$R_L$). In this way, the processor 150 may classify the level of dirtiness of the filter F1 into different levels according to the sensing voltage Vout. In some embodiments, when the sensing voltage Vout falls within a first voltage interval, the processor 150 may determine that the level of dirtiness of the filter F1 is the first level. When the sensing voltage Vout falls within a second voltage interval, the processor 150 may determine that the level of dirtiness of the filter F1 is the second level.

It should be noted that in the abovementioned embodiments, the level of dirtiness of the filter F1 is divided into the first level and the second level as an example for description, but the level of dirtiness of the filter F1 may be divided into more different levels in other embodiments. In addition, the time threshold value may also be changed according to different increments based on the level of dirtiness being divided into different levels. Besides, in some embodiments, the processor 150 may regularly detect the level of dirtiness of the filter F1 through the optical sensing element 110, so as to detect the situation that the filter F1 needs to be cleaned before the accumulated operating time is greater than or equal to the time threshold value.

Figure 7:
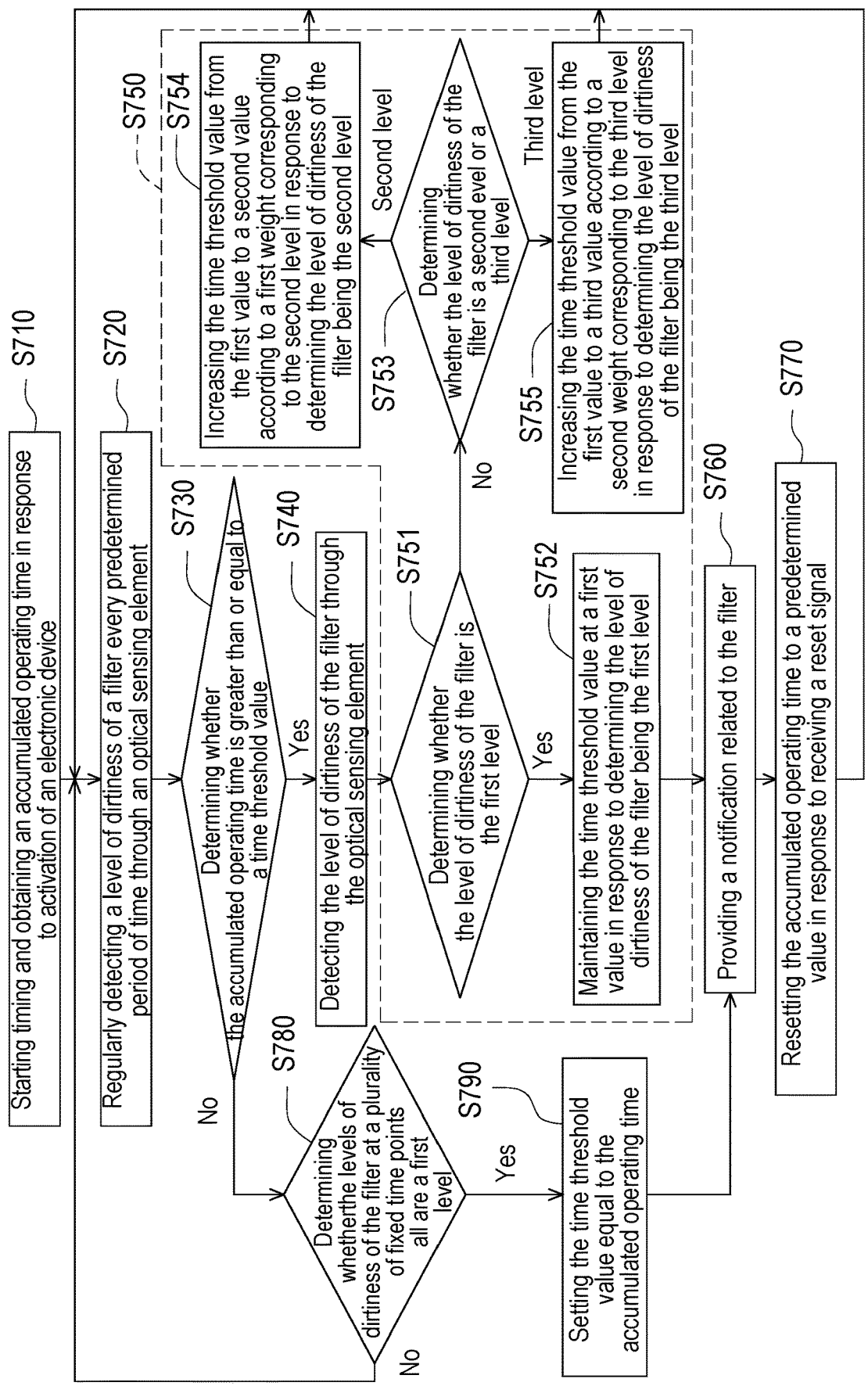
FIG. 7 illustrates a flow chart of a method for detecting filter status according to an embodiment of the disclosure.

FIG. 7 illustrates a flow chart of a method for detecting filter status according to an embodiment of the disclosure. With reference to FIG. 1 and FIG. 7, the method provided by this embodiment is applicable to the electronic device 100 provided by the foregoing embodiments, and steps of the method for detecting the filter status provided by this embodiment are described in detail as follows together with the elements in the electronic device 100.

In step S710, in response to the activation of the electronic device 100, the processor 150 starts timing and obtains an accumulated operating time. In step S720, the processor 150 regularly detects the level of dirtiness of the filter F1 every predetermined period of time through the optical sensing element 110. For instance, the processor 150 may control the optical sensing element 110 to detect the level of dirtiness of the filter F1 every hour.

In step S730, the processor 150 determines whether the accumulated operating time is greater than or equal to a time threshold value. If no is determined in step S730, in step S780, the processor 150 determines whether the levels of dirtiness of the filter F1 at a plurality of fixed time points all are a first level. If yes is determined in step S780, in step S790, in response to determining the levels of dirtiness of the filter F1 at the fixed time points all being the first level, the processor 150 sets the time threshold value equal to the accumulated operating time. If no is determined in step S780, step S720 is performed again.

To be specific, under the condition of regularly detecting the level of dirtiness of the filter F1 through the optical sensing element 110, the processor 150 may determine whether the level of dirtiness of the filter F1 is determined to be the first level for three consecutive times (i.e., at 3 fixed time points). If yes is determined, it means that the filter F1 needs to be cleaned before the accumulated operating time is greater than or equal to the time threshold value. Therefore, the processor 150 may directly set the time threshold value equal to the accumulated operating time. Further, following step S760, in response to determining the levels of dirtiness of the filter F1 at the fixed time points all being the first level, the processor 150 provides a notification related to the filter F1.

On the other hand, if yes is determined in step S730, in step S740, the processor 150 detects the level of dirtiness of the filter F1 through the optical sensing element 110. In step S750, the processor 150 may adjust the time threshold value according to the level of dirtiness of the filter F1. In some embodiments, step S750 may be implemented as steps S751 to S755.

In step S751, the processor 150 determines whether the level of dirtiness of the filter F1 is the first level. That is, the processor 150 may determine whether the level of dirtiness of the filter F1 is the first level for which cleaning is required. If yes is determined in step S751, in step S752, in response to determining the level of dirtiness of the filter F1 being the first level, the processor 150 maintains the time threshold value at a first value. After that, in step S760, in response to the accumulated operating time being equal to the time threshold value and determining the level of dirtiness of the filter being the first level, the processor 150 provides the notification related to the filter F1. In step S770, in response to receiving a reset signal through the human-machine interface device 120, the processor 150 resets the accumulated operating time to a predetermined value.

In contrast, if no is determined in step S751, in step S753, the processor 150 determines whether the level of dirtiness of the filter F1 is a second level or a third level. Herein, the second level may represent a mild level of dirtiness for which the filter F1 does not yet need to be cleaned, and the third level may represent a moderate level of dirtiness for which the filter F1 does not yet need to be cleaned. Based on the description provided in the foregoing embodiments, the processor 150 may classify the level of dirtiness of the filter as the first level, the second level, or the third level according to the magnitude of the sensing voltage provided by the optical sensing element 110.

If the level of dirtiness of the filter F1 is the second level, in step S754, in response to determining the level of dirtiness of the filter F1 being the second level, the processor 150 may increase the time threshold value from the first value to a second value according to a first weight corresponding to the second level. If the level of dirtiness of the filter F1 is the third level, in step S755, in response to determining the level of dirtiness of the filter F1 being the third level, the processor 150 may increase the time threshold value from the first value to a third value according to a second weight corresponding to the third level. Herein, the third value is different from the second value. After step S754 and step S755, the processor 150 may not reset the accumulated operating time to 0 but keeps on accumulating the accumulated operating time.

To be specific, according to the level of dirtiness of the filter F1 being the second level or the third level, the processor 150 may increase the time threshold value according to different weights. For instance, the weight corresponding to the mild level of dirtiness (the second level) may be 0.1, and the weight corresponding to the moderate level of dirtiness (the third level) may be 0.5. Taking the calculation method of formula (1) as an example, it is assumed that the first value of the time threshold value is 500 hours. The processor 150 may increase the time threshold value from 500 hours to 950 hours according to the weight corresponding to the mild level of dirtiness. The processor 150 may increase the time threshold value from 500 hours to 750 hours according to the weight corresponding to the moderate level of dirtiness.

Based on the process shown in FIG. 7, before the accumulated operating time reaches the time threshold value, if the optical sensing element 110 detects that the filter F1 has reached the first level for which cleaning is required, the human-machine interface device 120 may provide a notification to the user to remind the user to clean the filter F1. When the accumulated operating time reaches the time threshold value, the optical sensing element 110 may be used to detect the level of dirtiness of the filter F1. If it is determined that the level of dirtiness of the filter F1 is the first level for which cleaning is required, the human-machine interface device 120 may provide a notification to the user to remind the user to clean the filter F1. If it is determined that the level of dirtiness of the filter F1 is the second level or the third level for which cleaning is not required, the time threshold value for determining whether to clean the filter F1 may be extended.

In view of the foregoing, in the embodiments of the disclosure, by judging whether the accumulated operating time is greater than or equal to the time threshold value, it is possible to know the timing at which a notification related filter cleaning may need to be provided to the user. When the accumulated operating time increases to be greater than or equal to the time threshold value, the level of dirtiness of the filter may be detected through the optical sensing element, so as to decide to change the time threshold value or to provide a notification related to filter cleaning to the user. In this way, the time threshold value may be closer to the time when the filter really needs to be cleaned, so that the filter may be replaced at a proper time. Further, since the filter may be replaced at a proper time, unnecessary waste caused by premature replacement of the filter may be avoided, and the situation of abnormal heat dissipation caused by late replacement the filter may also be avoided.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for detecting filter status applicable to an electronic device having a filter, comprising:
    starting timing and obtaining an accumulated operating time in response to activation of the electronic device;
    detecting a level of dirtiness of the filter through an optical sensing element in response to the accumulated operating time being greater than or equal to a time threshold value;
    adjusting the time threshold value according to the level of dirtiness of the filter; and
    providing a notification related to the filter according to the level of dirtiness of the filter,
    wherein the step of adjusting the time threshold value according to the level of dirtiness of the filter comprises:
    maintaining the time threshold value at a first value in response to determining the level of dirtiness of the filter being a first level; and
    increasing the time threshold value from the first value to a second value according to a first weight corresponding to a second level in response to determining the level of dirtiness of the filter being the second level.

2. The method for detecting the filter status according to claim 1, wherein the step of increasing the time threshold value from the first value to the second value according to the first weight corresponding to the second level comprises:
   determining a time increase factor according to the first weight; and
   multiplying the first value by the time increase factor and obtaining the second value.

3. The method for detecting the filter status according to claim 1, wherein the step of adjusting the time threshold value according to the level of dirtiness of the filter further comprises:
   increasing the time threshold value from the first value to a third value according to a second weight corresponding to a third level in response to determining the level of dirtiness of the filter being the third level.

4. The method for detecting the filter status according to claim 1, wherein the step of providing the notification related to the filter according to the level of dirtiness of the filter comprises:
   providing the notification related to the filter in response to the accumulated operating time being greater than or equal to the time threshold value and determining the level of dirtiness of the filter being the first level.

5. The method for detecting the filter status according to claim 1, wherein the step of detecting the level of dirtiness of the filter through the optical sensing element comprises:
   emitting a light ray through a light emitter of the optical sensing element;
   sensing reflected light of the light ray and generating a sensing voltage through a light sensor of the optical sensing element; and
   determining the level of dirtiness of the filter according to the sensing voltage.

6. The method for detecting the filter status according to claim 5, wherein the light sensor comprises a photo transistor, and the sensing voltage is determined by the photo transistor operating in a linear region according to the reflected light.

7. The method for detecting the filter status according to claim 1, further comprising:
   regularly detecting the level of dirtiness of the filter every predetermined period of time through the optical sensing element; and
   setting the time threshold value equal to the accumulated operating time in response to determining the levels of dirtiness of the filter at a plurality of fixed time points all being a first level.

8. The method for detecting the filter status according to claim 7, wherein the step of providing the notification related to the filter according to the level of dirtiness of the filter comprises:
   providing the notification related to the filter in response to determining the levels of dirtiness of the filter at the fixed time points all being the first level.

9. The method for detecting the filter status according to claim 1, further comprising:
   resetting the accumulated operating time to a predetermined value in response to receiving a reset signal.

10. An electronic device, comprising:
   a filter;
   an optical sensing element;
   a human-machine interface device; and
   a processor coupled to the optical sensing element and the human-machine interface device and configured to:
   start timing and obtain an accumulated operating time in response to activation of the electronic device,
   detect a level of dirtiness of the filter through an optical sensing element in response to the accumulated operating time being greater than or equal to a time threshold value,
   adjust the time threshold value according to the level of dirtiness of the filter,
   provide a notification related to the filter according to the level of dirtiness of the filter through the human-machine interface device,
   maintain the time threshold value at a first value in response to determining the level of dirtiness of the filter being a first level, and
   increase the time threshold value from the first value to a second value according to a first weight corresponding to a second level in response to determining the level of dirtiness of the filter being the second level.

11. The electronic device according to claim 10, wherein the processor is further configured to:
   determine a time increase factor according to the first weight, and
   multiply the first value by the time increase factor and obtain the second value.

12. The electronic device according to claim 10, wherein the processor is further configured to:
   increase the time threshold value from the first value to a third value according to a second weight corresponding to a third level in response to determining the level of dirtiness of the filter being the third level.

13. The electronic device according to claim 10, wherein the processor is further configured to:
   control the human-machine interface device to provide the notification related to the filter in response to the accumulated operating time being greater than or equal to the time threshold value and determining the level of dirtiness of the filter being the first level.

14. The electronic device according to claim 10, wherein the optical sensing element comprises a light emitter and a light sensor, and the processor is further configured to:
   control the light emitter to emit a light ray,
   control the light sensor to sense reflected light of the light ray and generate a sensing voltage, and
   determine the level of dirtiness of the filter according to the sensing voltage.

15. The electronic device according to claim 14, wherein the light sensor comprises a photo transistor, and the sensing voltage is determined by the photo transistor operating in a linear region according to the reflected light.

16. The electronic device according to claim 10, wherein the processor is further configured to:
   regularly detect the level of dirtiness of the filter every predetermined period of time through the optical sensing element, and
   set the time threshold value equal to the accumulated operating time in response to determining the levels of dirtiness of the filter at a plurality of fixed time points all being a first level.

17. The electronic device according to claim 16, wherein the processor is further configured to:
   control the human-machine interface device to provide the notification related to the filter in response to determining the levels of dirtiness of the filter at the fixed time points all being the first level.

18. The electronic device according to claim 10, wherein the processor is further configured to:

reset the accumulated operating time to a predetermined value in response to receiving a reset signal through the human-machine interface device.

\* \* \* \* \*